(12) United States Patent
Perkins et al.

(10) Patent No.: US 12,249,771 B2
(45) Date of Patent: Mar. 11, 2025

(54) BEAM STEERING AND NULLING FOR A DIFFERENTIALLY SEGMENTED APERTURE ANTENNA

(71) Applicant: Battelle Memorial Institute, Columbus, OH (US)

(72) Inventors: Daniel A. Perkins, Lewis Center, OH (US); Raphael J. Welsh, Powell, OH (US)

(73) Assignee: Battelle Memorial Institute, Columbus, OH (US)

( * ) Notice: Subject to any disclaimer, the term of this patent is extended or adjusted under 35 U.S.C. 154(b) by 277 days.

(21) Appl. No.: 18/050,634

(22) Filed: Oct. 28, 2022

(65) Prior Publication Data
US 2024/0339753 A1    Oct. 10, 2024

Related U.S. Application Data

(60) Provisional application No. 63/273,346, filed on Oct. 29, 2021.

(51) Int. Cl.
 *H01Q 3/36* (2006.01)
 *H01Q 21/06* (2006.01)
 *H01Q 21/29* (2006.01)

(52) U.S. Cl.
 CPC ............. *H01Q 3/36* (2013.01); *H01Q 21/064* (2013.01); *H01Q 21/29* (2013.01)

(58) Field of Classification Search
 CPC ................................... H01Q 3/36; H01Q 3/26
 See application file for complete search history.

(56) References Cited

U.S. PATENT DOCUMENTS

| | | | |
|---|---|---|---|
| 4,298,873 A | 11/1981 | Roberts | |
| 2014/0210668 A1* | 7/2014 | Wang | H01Q 3/34 342/372 |

(Continued)

FOREIGN PATENT DOCUMENTS

WO    2017086855 A1    5/2017

OTHER PUBLICATIONS

International Search Report and Written Opinion of International Application No. PCT/US2022/078857, mail date Mar. 24, 2023, 12 pages.

(Continued)

*Primary Examiner* — Ladimir Magloire
*Assistant Examiner* — Eric K Hodac
(74) *Attorney, Agent, or Firm* — Grossman, Tucker, Perreault & Pfleger, PLLC; Donald G. Weiss

(57) ABSTRACT

A beam steering system includes a differentially segmented aperture antenna comprising a plurality of pyramid structures arranged in an array, and a plurality of elements formed in an array, each element being defined between two adjacent pyramid structures; phase conversion circuitry to determine a phase conversion for each element, the phase conversion for each element being based on an angle of a target with respect to the element, and an operating frequency of the DSA antenna; transmit phase shift circuitry to apply a phase difference for each element based on the phase conversion, the phase difference steering the signal to the target so that the signal interferes constructively; and receive phase shift circuitry to apply a phase difference for each element based on the phase conversion, causing the signal to interfere constructively for a signal of interest, and suppresses an unwanted signal by steering the signal into a null.

20 Claims, 6 Drawing Sheets

(56) References Cited

U.S. PATENT DOCUMENTS

2015/0378241 A1 12/2015 Eldada
2020/0343645 A1 10/2020 Perkins et al.

OTHER PUBLICATIONS

Li, et al., "Recent Advances in Focused Ion Beam Nanofabrication for Nanostructures and Devices: Fundamentals and Applications", The Royal Society of Chemistry, Dec. 10, 2020, 37 pages.
International Preliminary Report on Patentability from corresponding PCT Appln. No. PCT/US2022/078857, dated May 10, 2024. 10 pages.

* cited by examiner

BEAM STEERING AND NULLING FOR A DIFFERENTIALLY SEGMENTED APERTURE ANTENNA

CROSS-REFERENCE TO RELATED APPLICATIONS

The present application claims the benefit of the filing date of U.S. Provisional Application Ser. No. 63/273,346, filed Oct. 29, 2021, the entire teachings of which application is hereby incorporated herein by reference.

STATEMENT REGARDING FEDERALLY SPONSORED RESEARCH OR DEVELOPMENT

This invention was made with government support under SC-BATTELLE-CIOSP3-2018 awarded by the United States Special Operations Command. The government has certain rights in the invention.

TECHNICAL FIELD

The present disclosure relates to beam steering and nulling for a differentially segmented aperture (DSA) antenna.

BACKGROUND

Beam steering is a technique for changing the direction of the main lobe of a radiation pattern. Beam steering changes the phase of the input signal on all radiating elements. This allows the signal to be targeted at a specific receiver. An antenna can employ radiating elements with a common frequency to steer a single beam in a specific direction, or different frequency beams can be steered in different directions to serve different users.

BRIEF DESCRIPTION OF THE DRAWINGS

Reference should be made to the following detailed description which should be read in conjunction with the following FIGS., wherein like numerals represent like parts.

DETAILED DESCRIPTION

Figure 1A:
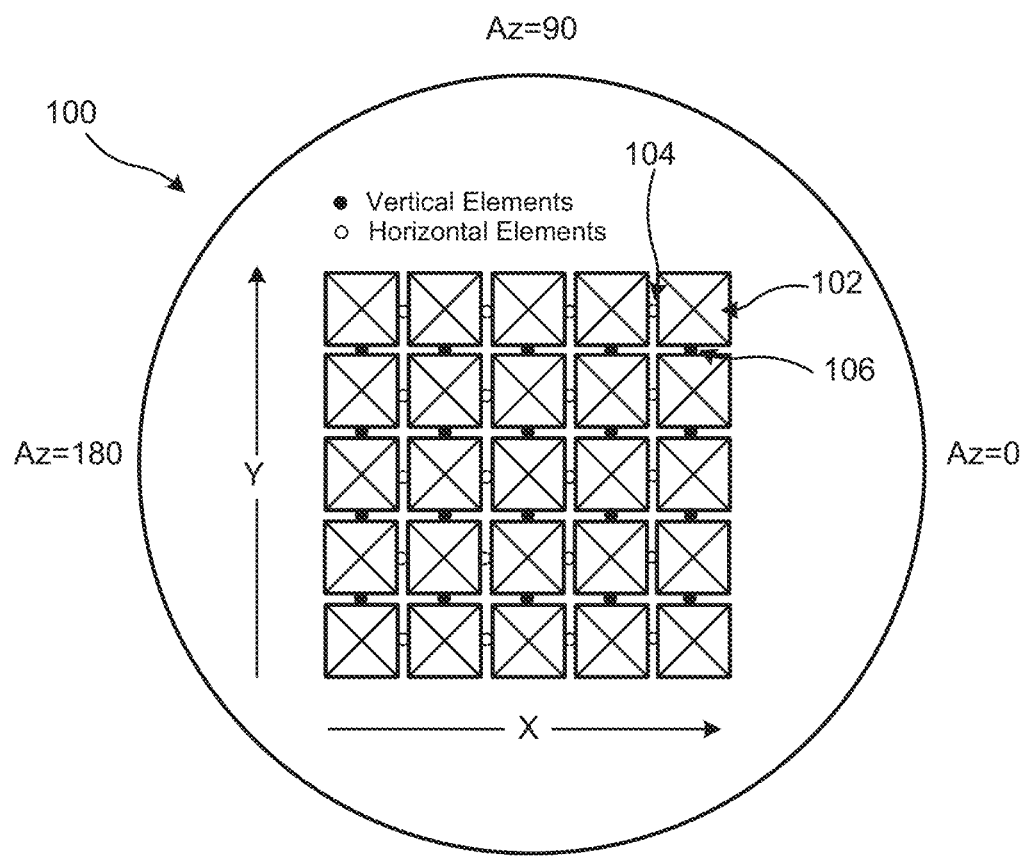
FIGS. 1A, 1B, and 1C illustrate various views of a differentially segmented aperture (DSA) antenna according to several embodiments of the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Beam steering is the process of locating the beam of a transmitting and/or receiving phased array at an angle relative to a boresight which maximizes the signal's magnitude via constructive interference. Beam steering allows a host radio system to maximize the signal transmitted to and received from a peer radio located at some arbitrary azimuth with respect to the host radio system. Likewise, for the case of transmission, radios outside of the transmitting radio's beam would receive an attenuated version of the transmitted signal. This may be desirable for applications that require transmission to a single target radio while limiting broadcast to untargeted radios.

Nulling is the process of steering an unwanted interfering signal emanating from some arbitrary azimuth into a null which minimizes the signal's magnitude. This is desirable for applications where an intended or unintended jamming signal inhibits a radio's ability to receive a signal of interest.

Direction finding is the process of determining the azimuth of an SOI from the measured signal phase difference sensed by multiple receiving elements located some distance apart. Beam steering, direction finding, and nulling are made possible with the use of multiple sensing and transmission elements that either receive or transmit signals that are equal but offset from each other in phase at any one point in time.

Figure 1B:
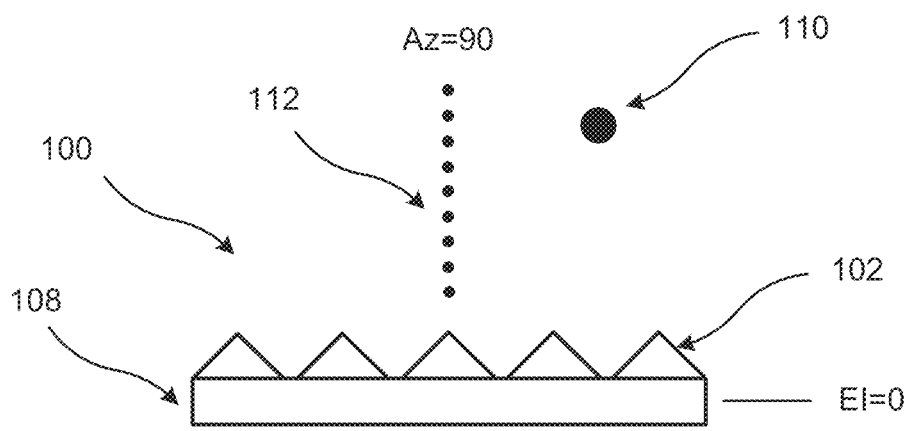
Figure 1C:
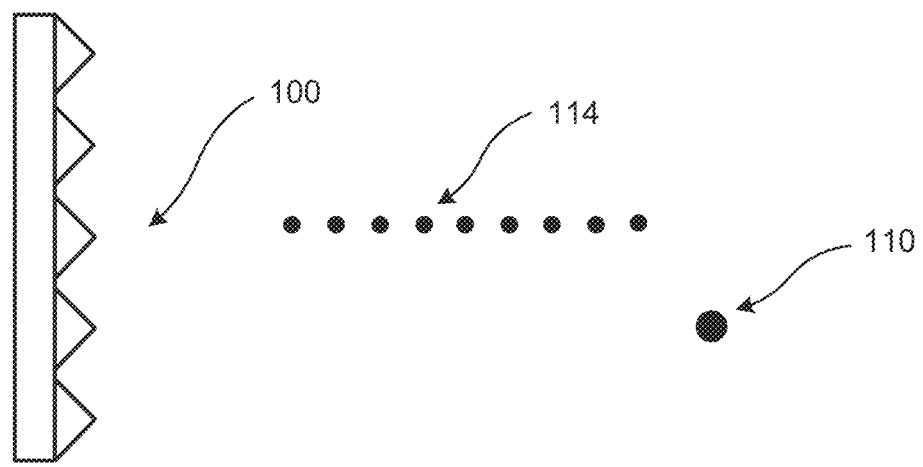

FIGS. 1A, 1B, and 1C illustrate various views of a DSA antenna array 100 according to several embodiments of the present disclosure. FIG. 1A illustrates a top-down view of an example DSA antenna array 100. The DSA antenna array 100 includes a plurality of protrusions, which in the examples herein are generally pyramid structures, arranged in an array, and one exemplary pyramid structure is labeled 102. In the example of FIG. 1A, the antenna 100 has 5 rows and 5 columns (5×5) of pyramid structures. At least one face of each pyramid structure faces an adjacent pyramid structure, as illustrated. Opposing faces of two adjacent pyramid structures form a horizontal element 104 or a vertical element 106. Element 104 is designated as a horizontal element, and element 106 is designated as a vertical element. Given that there are 5 rows and 5 columns (5×5) of pyramid structures in this example, there are 5 rows of horizontal elements 104, and each row includes 4 columns of horizontal elements 104. Thus, the horizontal elements 104 form a (5×4) array, totaling 20 horizontal elements. Also given that there are 5 rows and 5 columns (5×5) of pyramid structures in this example, there are 5 columns of vertical elements 106, and each column includes 4 rows of vertical elements 106. Thus, the vertical elements 106 form a (4×5) array, totaling 20 vertical elements. Thus, vertical and horizontal elements 104, 106 are arranged in an (m×n) array, having m number of rows and n number of columns of elements. In the example of FIG. 1A, the vertical elements 106 are formed in columns along the X-axis, and the horizontal elements 104 are formed in rows along the Y-axis. In some embodiments, the pyramid structures are generally identical to one another, and are also generally equidistant from each other, for example, each element is 1" apart from the adjacent element. The electromagnetic position of an element 104, 106 is the phase center for that element. Each phase center represents a transmission (Tx) and reception (Rx) point for signals transmitted by, or received by, an element.

FIG. 1B illustrates a cross-sectional view of the DSA antenna array 100, illustrating the pyramid-shaped structures 102 formed on a base dielectric layer 108. FIG. 1B also illustrates the DSA antenna array 100 in a position for communication (RX and/or TX) with a target 110. The target 110 is positioned at an angle of elevation ("El.Ang.") and an angle of azimuth ("Az.Ang.") with respect to the X-Y plane of the DSA antenna array 100. In this example, the Az.Ang. is the angle of the target 110 with respect to an axis 112 normal to the front face of the array in the X direction. FIG. 1C also illustrates a cross-sectional view of the DSA antenna array 100 in a position for communication (RX and/or TX) with the target 110. In this example, the El.Ang. is the angle of the target 110 with respect to an axis 114 normal to the front face of the array in the Y direction. As will be described in greater detail below, the horizontal elements 104 and the vertical elements 106 of the DSA antenna array 100 may be controlled to impart a phase shift for Rx and/or Tx communication with the target 110 to optimize signal gain between the DSA antenna array 100 and the target 110.

In some embodiments, the disclosed system includes beam steering circuitry. As a general matter, and with continued reference to FIGS. 1A, 1B and 1C, the azimuth and/or elevation angle of the target 110 relative to the orientation of the array 100 generally operates to affect the gain of the signal in both Rx and Tx operations in the direction of the target 110. For example, the peak gain of the array generally exists where the beam pattern of the array 100, specifically a main lobe of the beam pattern, is pointed at the target 110. Accordingly, the beam steering circuitry is generally configured to impart a phase angle on each of the elements (104, 106) so that, in effect, the array is pointing directly at the target 110 (and without physical movement of the array 110) to maximize communication gain between the array 100 and target 110.

In some embodiments, the beam steering circuitry includes phase conversion circuitry generally configured to determine a phase gradient across the array (in both X and Y dimensions) to maximize signal strength between the array and the target. The phase gradient is based on the azimuth and elevation angle of the target with respect to the array, a frequency of operation (f) and the orientation of the DSA array with respect to the target. The system applies a phase conversion to each element in the DSA array based on the phase gradient.

In some embodiments, the beam steering circuitry also includes transmit phase shift circuitry to apply a transmit phase difference for each element based on the phase conversion to steer the signal radiating from each element to the target so that the signal from each element interferes constructively. In addition, the beam steering circuitry also includes receive phase shift circuitry to apply a receive phase difference for each element based on the phase conversion, which causes the signal received by each element to interfere constructively for the signal of interest, and suppresses an unwanted signal from the element by steering the unwanted signal into a null.

Figure 2:
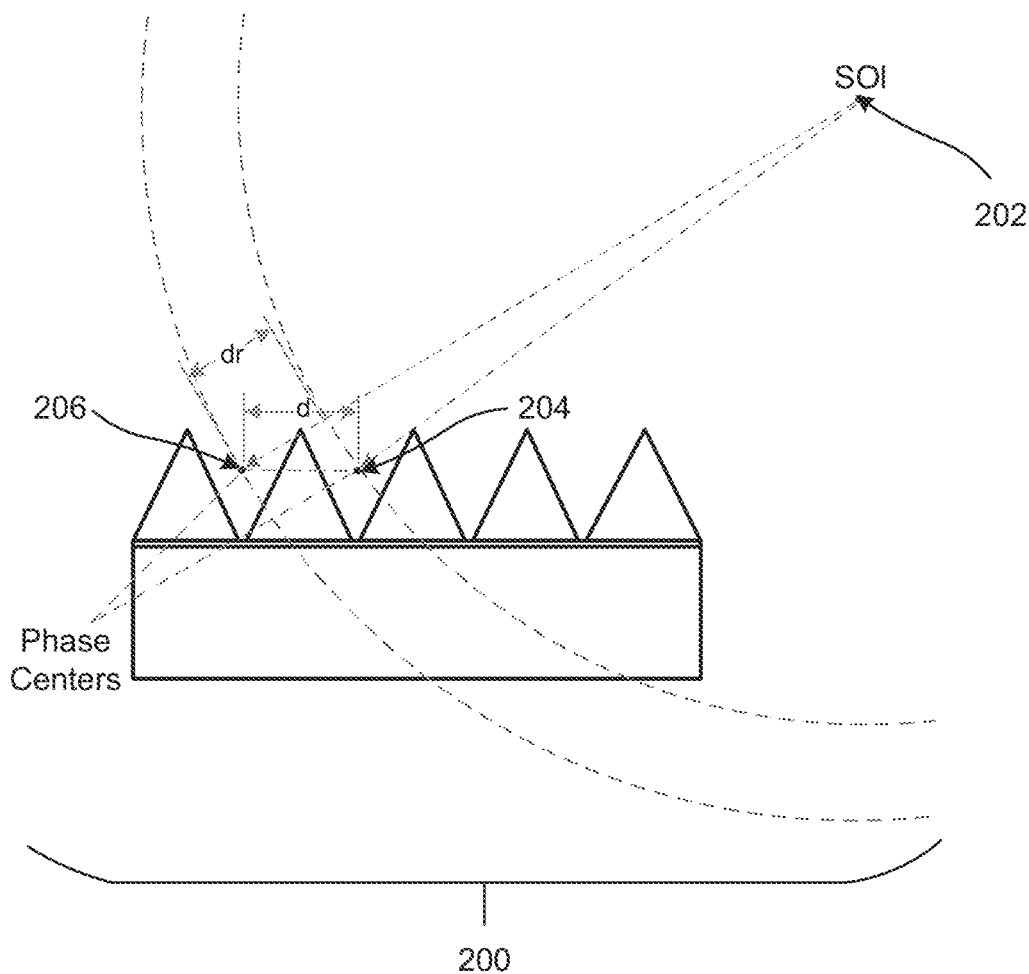
FIG. 2 illustrates a signal of interest (SOI) transmission from a point in space that is received by a DSA antenna according to several embodiments of the present disclosure.

FIG. 2 illustrates an SOI transmission 200 from a point in space that is received by a DSA antenna according to several embodiments of the present disclosure. FIG. 2 includes a signal of interest SOI 202, which emits an electromagnetic wave in free space that propagates at the speed of light (c=3e8 m/s). As the SOI wave propagates, it is sensed by a DSA sensing element (segment) at some phase angle for a given point in time. The location in space where the wave is sensed is referred to as the phase center of the segment. In the example of FIG. 2, the first location in space where the wave is sensed is denoted as phase center 204. As the wave continues to propagate, it is sensed by the next nearest segment at the same phase angle, at some later point time by phase center 206. The difference in time is equal to the distance of propagation (dr), which is the distance the wave has traveled in free space from the first element to the next divided by the speed of light, according to formula (1).

$$t_{dr}(s) = \frac{dr(m)}{3.0 * 10^8 (m/s)} \quad (1)$$

Similarly, at any one point in time, the difference in phase θ measured by the two elements is related to the time ($t_{dr}$) and the frequency (f) of the SOI by formula (2).

$$\theta(\text{degrees}) = 360(\text{degrees/cycle}) * f(\text{Hz}) * t_{dr}(s) \quad (2)$$

From this relationship, the measured phase can be used to calculate the distance of propagation between the two elements, as shown in formula (3).

$$dr(m) = \frac{\theta(\text{degrees})}{360(\text{degrees/cycle}) * f(\text{Hz})} * 3.0 * 10^8 (m/s) \quad (3)$$

Figure 3:
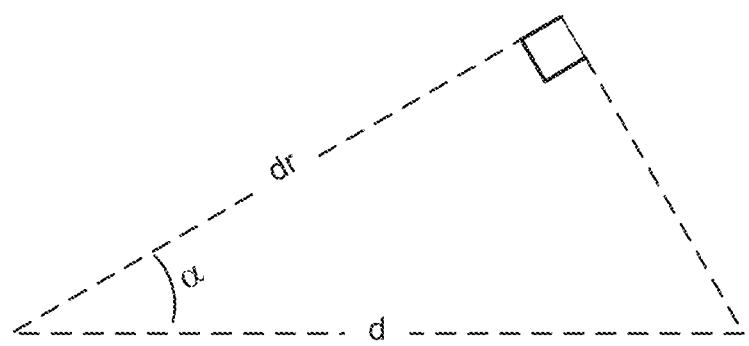
FIG. 3 illustrates a triangle used to determine the angle at which a wave propagates according to several embodiments of the present disclosure.

As the distance between the SOI source and the receiving elements becomes large compared to the wavelength of the signal, the triangle formed in FIG. 2 by the propagating wave approximates a right triangle. Thus, the distance of propagation along with the known fixed distance between the two elements can then be used to determine the angle at which the wave propagates (azimuth) by solving the right triangle in FIG. 3 for α, as shown in formula (4).

$$\alpha = \cos^{-1}\left(\frac{dr}{d}\right) \quad (4)$$

By measuring the phase angle between DSA aperture segments, the disclosed system determines the azimuth of an SOI. This is essentially the process of direction finding. Similarly, the phase of a transmitted signal between DSA aperture segments can be manipulated to correspond to the azimuth of a distant receiving radio. This allows the signals transmitted by the DSA aperture segments to be constructively combined in the far field at the azimuth of the receiving radio providing it with higher signal levels.

Figure 4:
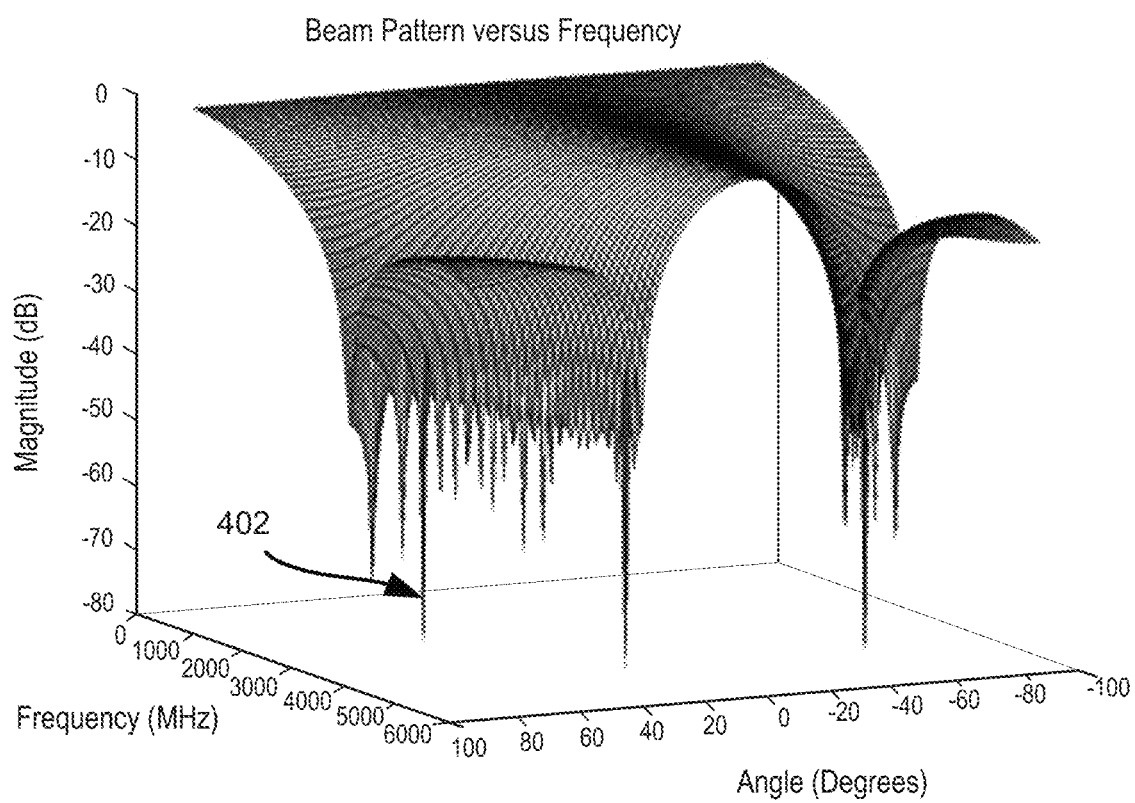
FIG. 4 illustrates a beam pattern plot visualizing nulls consistent with the present disclosure.

As described earlier, the DSA consists of multiple transmission/sensing segments in the form of an array. According to several embodiments of the present disclosure, a received signal is ultimately produced by the combination (summation) of the signals sensed at each segment. Similarly, a transmitted signal applied to each segment combines in the far field as a single propagating wave that can be sensed by a distant receiver. The phase angles of each segment relative to each other affect the amplitude of the combined signal by means of constructive and destructive interference. Two waves that have precisely the same frequency are said to be phase coherent in that the phase difference between the two waves is constant. Phase coherent waves that have a phase difference equal to zero are said to be in-phase. Two in-phase waves, when combined, produce a summation wave that has twice the amplitude. This is known as constructive interference. Conversely, when the phase difference between two phase coherent waves is 180 degrees, the second wave completely cancels the first one producing a summation wave with zero amplitude. This is known as destructive interference and the resulting signal is referred to as a null, and the angle is referred to as a null angle, and the shift required to produce the null is referred to as a null phase shift. Nulls, e.g., null 402, are visualized in the beam pattern plot of FIG. 4 as the sharp lower magnitude excursions on either side of the main lobe for higher frequency signals. The span of the main lobe is known as the First Null Beam Width (FNBW). Also shown in FIG. 4 is the expected magnitude reduction as multiple signals trend from interfering constructively to destructively.

In some embodiments, the DSA performs beam steering by manipulating the phase difference between aperture segments so that the signals radiating to/from these segments interfere constructively. This phase difference is associated with the azimuth of a received signal or receiving radio. If the azimuth of an SOI or receiving radio is known, a single-phase shift of each aperture segment relative to each other will maximize the signal at the desired azimuth. If the azimuth is unknown, a scan through a range of angles for a received signal can be used to determine the azimuth at which the combined signal is at a maximum. For communication links, this same azimuth can, in turn, be used for transmission.

Figure 5:
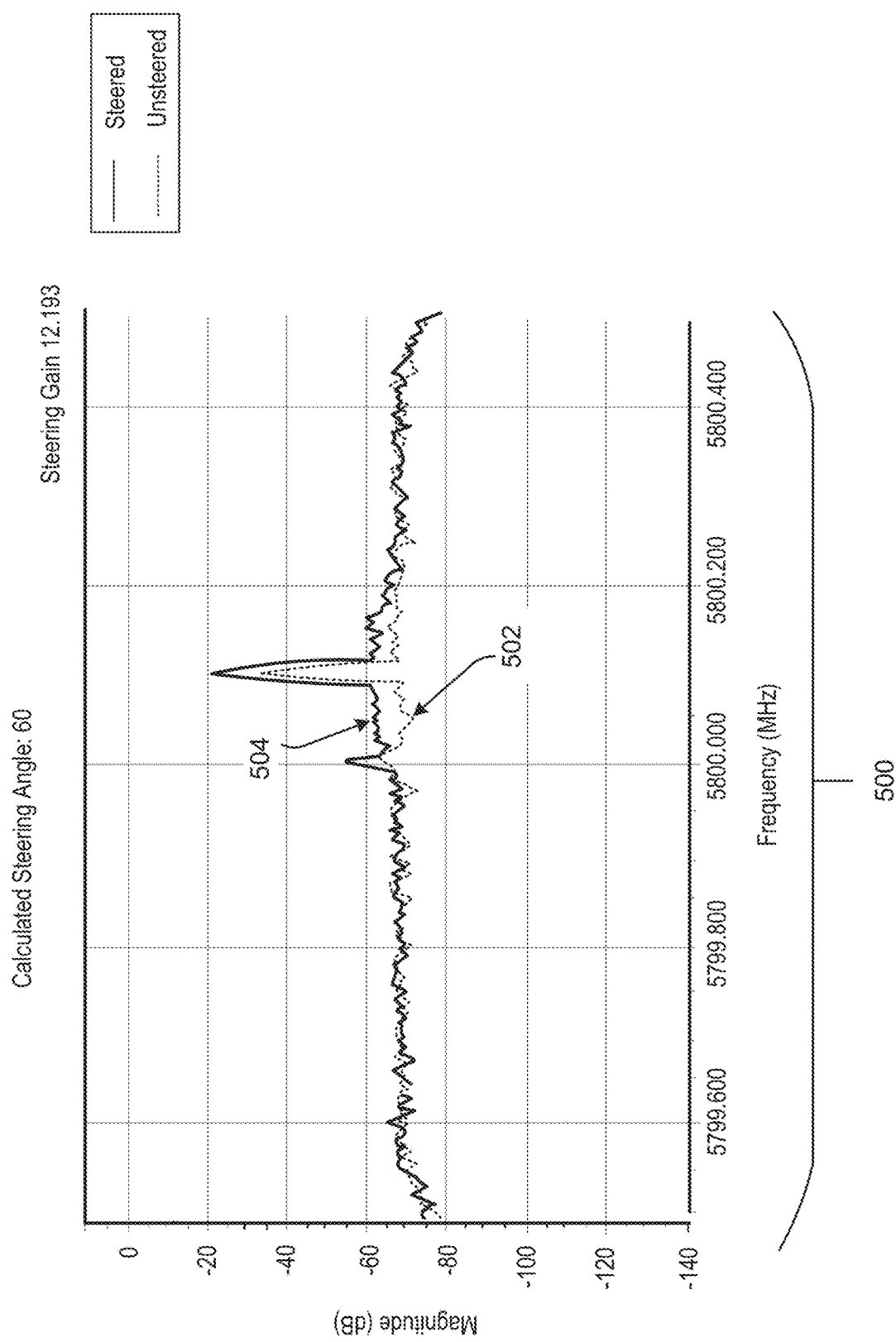
FIG. 5 illustrates frequency response of a 5800.1 MHz signal located at a 60-degree azimuth as measured with the DSA antenna, consistent with the present disclosure.

FIG. 5 illustrates an exemplary frequency response 500 of a 5800.1 MHz signal located at a 60-degree azimuth as measured with the DSA, consistent with the present disclosure. This illustrates an example of beam steering and direction finding. The first trace 502 shows the response of the "un-steered" signal which is simply the unprocessed raw signal after the signals from the four DSA columns have been combined. The second trace 504 shows the "steered" signal which is the sum of the four DSA column signals that have phase shifts applied such that they benefit from maximum constructive interference at a steering angle of 60 degrees. The difference in amplitude between the steered and un-steered signal or the "steering gain" is 12.193 dB.

In the absence of beam steering, the signal magnitude of an SOI that is off boresight is expected to be reduced due to destructive interference. Beam steering is the practice of bringing those segmented signals back into phase so that they interfere constructively providing maximum signal response.

In some embodiments, the degree to which beam steering is effective is determined by the signal beam width which is, in-turn, determined by the wavelength of the signal being steered and the geometry of the aperture. As the frequency of a signal increases, the signal wavelength decreases causing a greater shift in the phase difference between aperture elements for angles off boresight. The magnitude of the combined signal from all aperture elements is reduced as the phase shift between aperture elements approaches 90 degrees. At this point it falls into a null and is theoretically zero. Note that a 90-degree phase shift between elements equates to a phase reference of (0°, 90°, 180°, 270°) for four elements in one dimension. The 0° and 180° signals destructively interfere while the 90° and 270° signals destructively interfere producing a null. FIG. 4 shows an example beam pattern of a 5"×5" 4×4 element DSA versus frequency. It can be seen from the plot that at low frequencies, the beam pattern is almost completely flat across the entire face of the aperture. At 500 MHz, for instance, there is no discernable signal drop-off as the signal azimuth rotates off boresight. As frequency increases, a lobe is formed showing magnitude drop-off at angles off boresight. At roughly 3.6 GHZ, 90-degrees off boresight in either direction corresponds to a 45-degree phase shift between aperture elements which produces nulls on either side of the main lobe. As frequency increases beyond 3.6 GHz, the main lobe becomes narrower as the nulls move closer to the center. Secondary lobes are produced as continuing phase shifts produce interference that is less destructive. The beam pattern for larger geometry apertures will scale such that a lobe will begin to form at lower frequencies.

In some embodiments, signals from unwanted interferers, for example, radio jammers, can be suppressed using the same methods that are employed in beam steering. The objective in this case is to steer these interferers into nulls. This occurs when the phase shift between two segments places the interfering signal received at one segment 180 degrees out of phase with that of the other segment. SOIs that are received from any other azimuth will experience a different phase offset between the two segments which will be outside the null. It can be seen from FIG. 4 that nulls are narrow and that just a few degrees outside a null can result in more than 50 dB of difference in signal magnitude.

In some embodiments, the process of nulling can be automated by performing a scan through a range of phase angles and calculating the magnitude of the combination of all aperture segments. The phase angle at which this magnitude is at a minimum will be a null. If an interfering signal is a dominant signal such that it occupies most of the energy in the band, the phase angle associated with the minimum magnitude of the entire band will fall very closely near the null. Further nulling accuracy can be realized by isolating the interfering signal in frequency and finding the null of the isolated signal.

Figure 6:
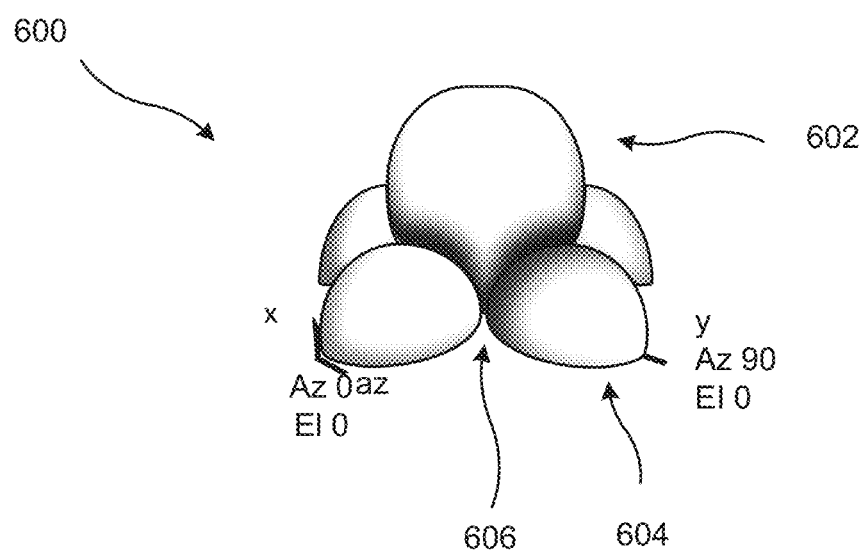
FIG. 6 illustrates beam patterns for the DSA antenna of FIGS. 1A, 1B, and 1C, consistent with the present disclosure.

FIG. 6 illustrates beam patterns for the DSA antenna of FIGS. 1A, 1B, and 1C according to some embodiment of the present disclosure. FIG. 6 illustrates a 3-dimensional graph of a beam pattern of the DSA antenna for a given frequency. As illustrated, the beam pattern includes a main lobe 602, which is directly in front of the DSA antenna, and several side lobes, one of which is labeled 604. The gain characteristics are maximized for Tx and Rx occurring within the main lobe 602 (e.g., when the DSA antenna is steered (described above) so that the main lobe 602 faces the target), and reduced gain when Tx and Rx occur within a side lobe 604. Between the main lobe 602 and side lobes 604 is a null position 606. The null position 606 corresponds to an azimuth angle and an elevation angle (referred to herein as "Null-Az.Ang" and "Null-El.Ang). The gain characteristics are minimized for Tx and Rx occurring within the main lobe (e.g., when the DSA antenna is steered (described above) so that null position 606 faces the target). As illustrated, there are typically a plurality of side lobes 604 and a plurality of null positions 606. As stated, the beam pattern is generally based on a design of the DSA antenna (e.g., the number of elements (m×n)) and the operating frequency. The beam pattern illustrated in FIG. 6 assumes a beam pattern for a DSA antenna with 4×4 elements and operating at 8.000 GHz.

According to one aspect of the disclosure there is thus provided a beam steering system, the system including a differentially segmented aperture (DSA) antenna comprising a plurality of pyramid structures arranged in an array, and a plurality of elements formed in an array, wherein each element being defined between two adjacent pyramid structures; phase conversion circuitry to determine a phase conversion for each element of the plurality of elements, wherein the phase conversion for each element being based on an angle of a target with respect to the element, and an operating frequency of the DSA antenna; transmit phase shift circuitry to apply a phase difference for each element based on the phase conversion, wherein the phase difference steers a signal radiating from each element to the target so that the signal from each element interferes constructively; and receive phase shift circuitry to apply a phase difference for each element based on the phase conversion, wherein the phase difference causes the signal received by each element to interfere constructively for a signal of interest, and suppresses an unwanted signal from the element by steering the unwanted signal into a null.

According to another aspect of the disclosure there is thus provided a beam steering system, the system including: a differentially segmented aperture (DSA) antenna comprising a plurality of pyramid structures arranged in an array, and a plurality of elements formed in an array, wherein each element being defined between two adjacent pyramid structures; the DSA antenna having a beam pattern having a main lobe and at least one side lobe, and a null position between the main lobe and at least one side lobe, the null position corresponding to a null angle, and wherein the beam pattern being based on a number of elements and an operating frequency of the DSA antenna; and a non-transitory storage device that includes machine-readable instructions that, when executed by one or more processors, cause the one or more processors to perform operations, comprising: determine a phase conversion for each element of the plurality of elements, wherein the phase conversion for each element being based on an angle of a target with respect to the element, and an operating frequency of the DSA antenna; determine a transmit phase difference for each element based on the phase conversion, wherein the transmit phase difference steers a signal radiating from each element to the target so that the signal from each element interferes constructively; and determine a receive phase difference for each element based on the phase conversion, wherein the receive phase difference causes the signal received by each element to interfere constructively for a signal of interest, and suppresses an unwanted signal from the element by steering the unwanted signal into the null angle.

According to yet another aspect of the disclosure there is thus provided a method for beam steering an antenna, the method including: determine a phase conversion for each element of a plurality of elements, wherein the phase conversion for each element being based on an angle of a target with respect to the element, and an operating frequency of a differentially segmented aperture (DSA) antenna; the DSA antenna comprising a plurality of pyramid structures arranged in an array; and a plurality of elements formed in an array comprising a set of direction elements, each element being defined between two adjacent pyramid structures, and a position of each element being located at a distance from a common origin of the elements of the array, the DSA antenna having a beam pattern having a main lobe and at least one side lobe, and a null position between the main lobe and at least one side lobe, the null position corresponding to a null angle, and wherein the beam pattern being based on a number of elements and an operating frequency of the DSA antenna; the phase conversion being based on an angle of a target with respect to the DSA antenna and an operating frequency of the DSA antenna; determine a phase conversion for each element of the plurality of elements, wherein the phase conversion for each element being based on an angle of a target with respect to the element, and an operating frequency of the DSA antenna; determine a transmit phase difference for each element based on the phase conversion, wherein the transmit phase difference steers a signal radiating from each element to the target so that the signal from each element interferes constructively; and determine a receive phase difference for each element based on the phase conversion, wherein the receive phase difference causes the signal received by each element to interfere constructively for a signal of interest, and suppresses an unwanted signal from the element by steering the unwanted signal into the null angle.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

"Circuitry", as used in any embodiment herein, may comprise, for example, singly or in any combination, hard-wired circuitry, programmable circuitry such as one or more computer processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations described herein may be implemented in a system that includes one or more non-transitory storage devices, including one or more computer readable storage media, having stored therein, individually or in combination, instructions that when executed by circuitry to perform the operations. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. The instructions may be of the form of firmware executable code, software executable code, embedded instruction sets, application software, etc. Other embodiments may be implemented as software executed by a programmable control device. Also, it is intended that operations described herein may be distributed across a plurality of physical devices, such as processing structures at more than one different physical location.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A beam steering system, comprising:
   a differentially segmented aperture (DSA) antenna comprising a plurality of pyramid structures arranged in an array, and a plurality of elements formed in an array, wherein each element being defined between two adjacent pyramid structures;
   phase conversion circuitry to determine a phase conversion for each element of the plurality of elements, wherein the phase conversion for each element being based on an angle of a target with respect to the element, and an operating frequency of the DSA antenna;
   transmit phase shift circuitry to apply a transmit phase difference for each element based on the phase conversion, wherein the transmit phase difference steers a signal radiating from each element to the target so that the signal from each element interferes constructively; and
   receive phase shift circuitry to apply a receive phase difference for each element based on the phase conversion, wherein the receive phase difference causes the signal received by each element to interfere constructively for a signal of interest, and suppresses an unwanted signal from the element by steering the unwanted signal into a null.

2. The system of claim 1, wherein each respective resultant transmit phase difference and receive phase difference applied to each respective element to cause a change in signal gain of the DSA antenna with respect to the target.

3. The system of claim 1, wherein the transmit phase difference and receive phase difference is incremented and/or decremented to generate a selected decrease in signal gain from the target.

4. The system of claim 1, wherein the phase difference θ for each element being determined by a first formula:

$$\theta(\text{degrees}) = 360(\text{degrees/cycle}) * f(\text{Hz}) * t_{dr}(\text{s})$$

wherein f is a frequency of the signal of interest and $t_{dr}$ is a distance of propagation between the element and an adjacent element.

5. The system of claim 4, wherein the distance of propagation between the element and an adjacent element being determined by a second formula:

$$dr(m) = \frac{\theta(\text{degrees})}{360(\text{degrees/cycle}) * f(\text{Hz})} * 3.0 * 10^8 (\text{m/s})$$

wherein f is a frequency of the signal of interest.

6. The system of claim 1, wherein steering the unwanted signal into the null further comprises:
   determine a first phase shift for the unwanted signal from a first element;
   apply the first phase shift to the unwanted signal from the first element create a first shifted signal;
   determine a second phase shift for the unwanted signal from a second element, wherein the second phase shift is determined to interfere destructively with the first shifted signal; and
   apply the second phase shift to the second element to create a second shifted signal, wherein the second shifted signal interferes destructively with the first shifted signal.

7. The system of claim 1, further comprising:
   determine a location of the target by incrementing and/or decrementing the phase conversion, and incrementing and/or decrementing the operating frequency.

8. A beam steering system, comprising:
   a differentially segmented aperture (DSA) antenna comprising a plurality of pyramid structures arranged in an array, and a plurality of elements formed in an array, wherein each element being defined between two adjacent pyramid structures; the DSA antenna having a beam pattern having a main lobe and at least one side lobe, and a null position between the main lobe and at least one side lobe, the null position corresponding to a null angle, and wherein the beam pattern being based on a number of elements and an operating frequency of the DSA antenna; and
   a non-transitory storage device that includes machine-readable instructions that, when executed by one or more processors, cause the one or more processors to perform operations, comprising:
   determine a phase conversion for each element of the plurality of elements, wherein the phase conversion for each element being based on an angle of a target with respect to the element, and an operating frequency of the DSA antenna;
   determine a transmit phase difference for each element based on the phase conversion, wherein the transmit phase difference steers a signal radiating from each element to the target so that the signal from each element interferes constructively; and
   determine a receive phase difference for each element based on the phase conversion, wherein the receive phase difference causes the signal received by each element to interfere constructively for a signal of interest, and suppresses an unwanted signal from the element by steering the unwanted signal into the null angle.

9. The system of claim 8, wherein the machine-readable instructions that, when executed by one or more processors, cause the one or more processors to perform operations, comprising:
   determine a null phase shift by multiplying the phase conversion by a position of each element relative to a common origin of the elements of the array, and subtracting or adding the null angle.

10. The system of claim 9, wherein the machine-readable instructions that, when executed by one or more processors, cause the one or more processors to perform operations, comprising:
apply each respective resultant null phase shift applied to each respective element to cause a change in signal gain of the DSA antenna with respect to the target.

11. The system of claim 8, wherein the machine-readable instructions that, when executed by one or more processors, cause the one or more processors to perform operations, comprising:
applying each respective resultant transmit phase difference and receive phase difference to each respective element to cause a change in signal gain of the DSA antenna with respect to the target.

12. The system of claim 8, wherein the machine-readable instructions that, when executed by one or more processors, cause the one or more processors to perform operations, comprising:
determining the transmit phase difference and the receive phase difference θ for each element by a first formula:

$$\theta(\text{degrees}) = 360(\text{degrees/cycle}) * f(\text{Hz}) * t_{dr}(s)$$

wherein f is a frequency of the signal of interest and $t_{dr}$ is a distance of propagation between the element and an adjacent element.

13. The system of claim 12, wherein the machine-readable instructions that, when executed by one or more processors, cause the one or more processors to perform operations, comprising:
determine a distance of propagation between the element and an adjacent element by a second formula:

$$dr(m) = \frac{\theta(\text{degrees})}{360(\text{degrees/cycle}) * f(\text{Hz})} * 3.0 * 10^8 (\text{m/s})$$

wherein f is a frequency of the signal of interest.

14. The system of claim 8, wherein the machine-readable instructions that, when executed by one or more processors, cause the one or more processors to perform operations, comprising:
determine a location of the target by incrementing and/or decrementing the phase conversion, and incrementing and/or decrementing the operating frequency.

15. A method for beam steering an antenna, comprising:
determine a phase conversion for each element of a plurality of elements, wherein the phase conversion for each element being based on an angle of a target with respect to the element, and an operating frequency of a differentially segmented aperture (DSA) antenna; the DSA antenna comprising a plurality of pyramid structures arranged in an array; and a plurality of elements formed in an array comprising a set of direction elements, each element being defined between two adjacent pyramid structures, and a position of each element being located at a distance from a common origin of the elements of the array, the DSA antenna having a beam pattern having a main lobe and at least one side lobe, and a null position between the main lobe and at least one side lobe, the null position corresponding to a null angle, and wherein the beam pattern being based on a number of elements and an operating frequency of the DSA antenna; the phase conversion being based on an angle of a target with respect to the DSA antenna and an operating frequency of the DSA antenna;
determine a phase conversion for each element of the plurality of elements, wherein the phase conversion for each element being based on an angle of a target with respect to the element, and an operating frequency of the DSA antenna;
determine a transmit phase difference for each element based on the phase conversion, wherein the transmit phase difference steers a signal radiating from each element to the target so that the signal from each element interferes constructively; and
determine a receive phase difference for each element based on the phase conversion, wherein the receive phase difference causes the signal received by each element to interfere constructively for a signal of interest, and suppresses an unwanted signal from the element by steering the unwanted signal into the null angle.

16. The method of claim 15, further comprising:
applying each respective resultant null phase shift to each respective element to cause a change in signal gain of the DSA antenna with respect to the target.

17. The method of claim 16, further comprising:
incrementing and/or decrementing the resultant null phase shift to generate a selected decrease in signal gain from the target.

18. The method of claim 16, further comprising:
determining the resultant null phase shift by multiplying the phase conversion by the position of the element relative to the common origin of the elements of the array, and subtracting or adding the null angle.

19. The method of claim 15, further comprising:
determining the transmit phase difference and the receive phase difference θ for each element by a first formula:

$$\theta(\text{degrees}) = 360(\text{degrees/cycle}) * f(\text{Hz}) * t_{dr}(s)$$

wherein f is a frequency of the signal of interest and $t_{dr}$ is a distance of propagation between the element and an adjacent element.

20. The method of claim 19, further comprising:
determine the distance of propagation between the element and an adjacent element by a second formula:

$$dr(m) = \frac{\theta(\text{degrees})}{360(\text{degrees/cycle}) * f(\text{Hz})} * 3.0 * 10^8 (\text{m/s})$$

wherein f is a frequency of the signal of interest.

* * * * *